United States Patent [19]
Lunn

[11] Patent Number: 5,816,892
[45] Date of Patent: Oct. 6, 1998

[54] POSITIONING CONTROL FOR COMBINED MILLING MACHINE AND INTERNALLY POSITIONED GRINDING WHEEL

[75] Inventor: Garfield R. Lunn, Amherstburg, Canada

[73] Assignee: Cobra Machine Tool Co., Inc., Tecumseh, Canada

[21] Appl. No.: 797,480

[22] Filed: Feb. 6, 1997

[51] Int. Cl.⁶ .......................... B24B 49/00; B24B 51/00
[52] U.S. Cl. ................................. 451/21; 451/70
[58] Field of Search ............................. 451/5, 11, 21, 451/65, 70, 4, 56, 57, 54, 63, 271, 294, 450, 461, 488, 516, 259, 449, 514, 517; 407/1, 42, 51, 61; 408/27, 22, 30, 145, 224, 225

[56] References Cited

U.S. PATENT DOCUMENTS

| | | |
|---|---|---|
| 1,284,092 | 11/1918 | Gray . |
| 3,866,359 | 2/1975 | Kikuchi .................................. 451/271 |
| 4,640,057 | 2/1987 | Salje ..................................... 51/165.87 |
| 4,675,975 | 6/1987 | Kucharczyk et al. ..................... 29/566 |
| 4,894,956 | 1/1990 | Honda et al. ............................. 51/5 B |
| 4,967,515 | 11/1990 | Tsujiuchi et al. ..................... 51/165.75 |
| 5,074,276 | 12/1991 | Katayama ............................. 125/13.02 |
| 5,146,715 | 9/1992 | Bando .................................. 51/165.77 |
| 5,197,230 | 3/1993 | Simpfendorfer et al. ................ 451/21 |
| 5,285,597 | 2/1994 | Hinzen ....................................... 51/5 C |
| 5,285,600 | 2/1994 | Shepley ..................................... 51/323 |
| 5,299,389 | 4/1994 | Yonaha et al. ........................ 51/165 R |
| 5,377,452 | 1/1995 | Yamaguchi ................................. 451/1 |
| 5,458,527 | 10/1995 | Kondo et al. ............................. 451/21 |
| 5,480,342 | 1/1996 | Bannayan et al. .......................... 451/5 |
| 5,484,327 | 1/1996 | Kovach .................................... 451/49 |
| 5,667,428 | 9/1997 | Lunn ....................................... 451/70 |

FOREIGN PATENT DOCUMENTS

| | | |
|---|---|---|
| 2520513 | 11/1975 | Germany . |
| 5208331 | 8/1993 | Japan . |

*Primary Examiner*—Timothy V. Eley
*Assistant Examiner*—Derris H. Banks
*Attorney, Agent, or Firm*—Howard & Howard

[57] ABSTRACT

An improved tool includes a milling tool rotatable about an axis, and a coaxially mounted grinding wheel positioned slightly axially towards a workpiece from the milling tool. The milling tool provides rough finish on a workpiece, and the grinding tool follows, providing finish grinding. The present invention recognizes that the grinding tool will be deflected away from the workpiece at high speed due to centrifugal forces. The present invention positions the milling tool relative to the grinding wheel at a location that compensates for the expected deflection of the grinding wheel, and achieves the desired amount of grinding. In further features of this invention, the phenomena of deflection of the grinding wheel due to increased speed is utilized to compensate for wear on the milling tool.

20 Claims, 3 Drawing Sheets

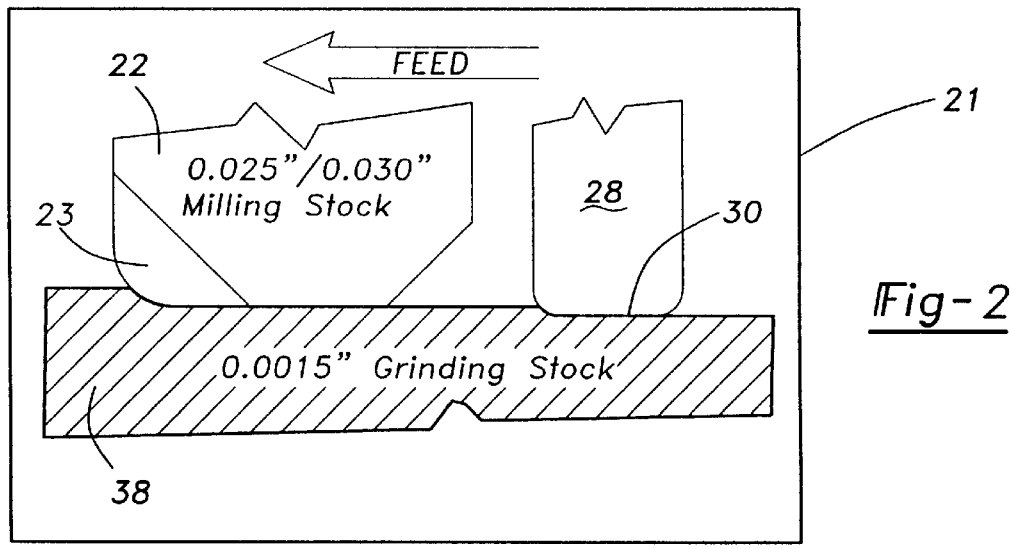
_Fig-2_
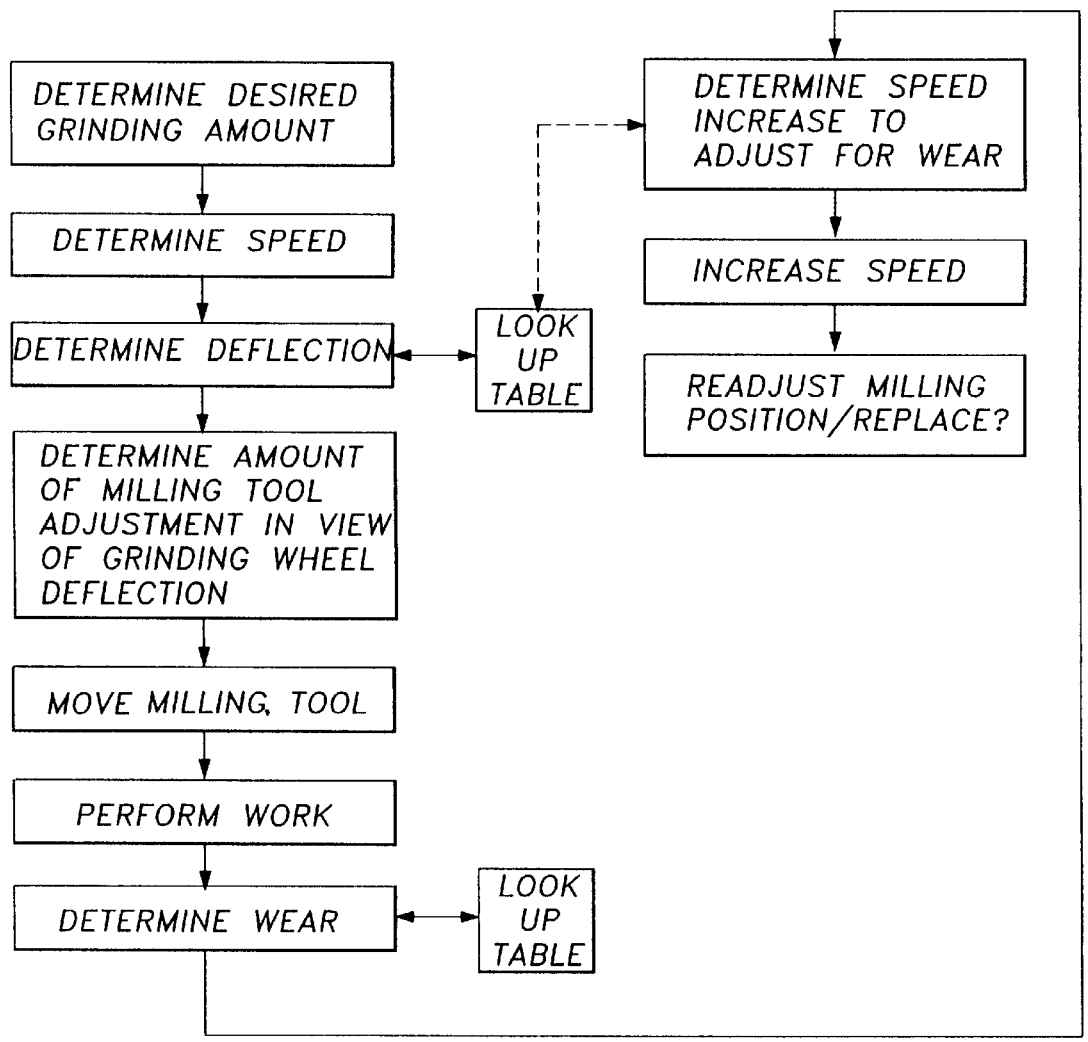
_Fig-4_

POSITIONING CONTROL FOR COMBINED MILLING MACHINE AND INTERNALLY POSITIONED GRINDING WHEEL

BACKGROUND OF THE INVENTION

This invention relates to an improved positioning control for properly positioning a milling cutter and an internally mounted grinding wheel.

The prior art includes a relatively complicated finishing tool that includes a milling cutting tool rotatable about an axis, and having cutting tools cutting a workpiece on a first plane. An internal grinding wheel is mounted within the rotational circumference and coaxially with the milling tool. The grinding wheel is positioned slightly forwardly, such that the grinding wheel follows the milling tool and performs a small amount of finish grinding on workpiece.

This tool has been used for fine finishing heavy metal parts. In particular, this type of tool is utilized in finishing metal engine parts in the automotive industry.

There are some deficiencies in the prior art tool. In particular, the grinding wheel is only slightly forward of the milling tool. The amount of grinding is often less than 0.002 inch. The grinding wheel is relatively flexible, and rotated at very high speed. As an example, it is not uncommon for the grinding wheel to be rotated at 5,000–7,000 RPM. Applicant has recognized that the relatively flexible grinding is thus exposed to centrifugal force that pulls its face rearwardly away from the workpiece. In fact, the amount of deflection of the wheel is often more than the amount of grinding finish. The prior art has not recognized this problem.

In addition, the cutting teeth on the milling tool wear over time. To provide the fine control over the relative position of the milling tool and grinding wheel, very frequent adjustment of the relative positions is required in the prior art. This is somewhat cumbersome, and reduces the efficiency of the machine.

SUMMARY OF THE INVENTION

In a disclosed embodiment of this invention, the control for a milling tool with an internally mounted grinding wheel positions the two relative to each other, such that deflection of the grinding wheel due to centrifugal force is anticipated and accommodated. In a preferred embodiment, the control determines the speed of the grinding wheel, and the expected deflection at that speed and uses the deflection in positioning the milling tool and the grinding wheel. More preferably, the positioning adjustment member positions the milling tool at a location relative to the grinding wheel, that includes a calculation based upon the expected RPM of the grinding wheel, and the corresponding deflection. That is, if it is desired to have 0.002 inch of grinding stock, and the grinding wheel will be rotating at a particular speed, the control determines the amount of deflection at that speed, and actually positions the milling tool at a location such that after the deflection due to the speed, the desired grinding amount will be achieved.

In preferred embodiments, the milling tool is positioned by an adjustment member connected with a control. The control is provided with a look-up table or formula that includes a reference between revolutions per minute of the grinding wheel and expected deflection of that grinding wheel. The look-up table or formula can be determined experimentally for the particular grinding wheel. The amount of deflection may vary with different types of grinding wheels. Once the control has determined the amount of deflection, the desired position of the milling tool is modified to incorporate the deflection. Thus, if the control determines that 0.002 inch of grinding is desired, and also determines that at the expected speed there will be 0.0015 inch of deflection, then the milling tool will be positioned 0.0035 inch behind the grinding tool. When the grinding tool is at its operating speed, the deflection will move it back rearwardly such that only 0.002 inch of grinding takes place.

The present invention is preferably utilized on a grinding wheel and milling tool wherein are coaxially mounted, and driven by separate motors. In a preferred embodiment, the milling tool is positioned by a pneumatic cylinder that drives the milling tool forwardly or rearwardly relative to the grinding tool. Alternatively, mechanical positioning structure may be utilized.

In another feature of this invention, wear on the milling tool is compensated for by adjusting the speed of the grinding tool. The desired speed for a particular machining operation is typically not exactly dictated. As an example, while it may be desired that the speed be between 4,000 and 6,000 RPM for one operation, it is typically not required that it be any one particular speed. The present invention recognizes that variation of the speed, and resultant deflection, may be utilized to adjust for wear on the milling tool. The milling tool provides gross machining of the workpiece, and the cutting teeth wear over time. The amount of wear can be determined experimentally, and predicted. Again, extremely accurate control over the relative positions of the milling tool and grinding wheel is desired. With wear, the milling tool recedes from the workpiece. The present invention adjusts for predicted wear after a number of machining passes by changing the speed of the grinding wheel, such that grinding wheel deflection increases to compensate for milling tool wear. Take an example where the original positioning of the grinding wheel and milling tool provide the above discussed 0.002 inch amount of grinding, and the control determines 0.0005 inches of wear has occurred on the milling tool. The control adjusts the speed of the grinding wheel upwardly to achieve 0.0005 inch of additional deflection of the grinding wheel. As long as this upward adjustment of speed is within an acceptable range of speed, the inventive method can be utilized to adjust for wear on the cutting tool.

Methods of operating the present invention, and an apparatus for achieving this invention, are all disclosed and claimed. The above discussed features and goals of this invention will be best understood from the following specification and drawings, of which the following is a brief description.

BRIEF DESCRIPTION OF THE DRAWINGS

FIG. 2 is a partial view of a workpiece being machined by the inventive tool.

FIG. 4 shows a flow chart of a method of positioning the grinding wheel and milling tool in the present invention.

DETAILED DESCRIPTION OF PREFERRED EMBODIMENT

Figure 1:
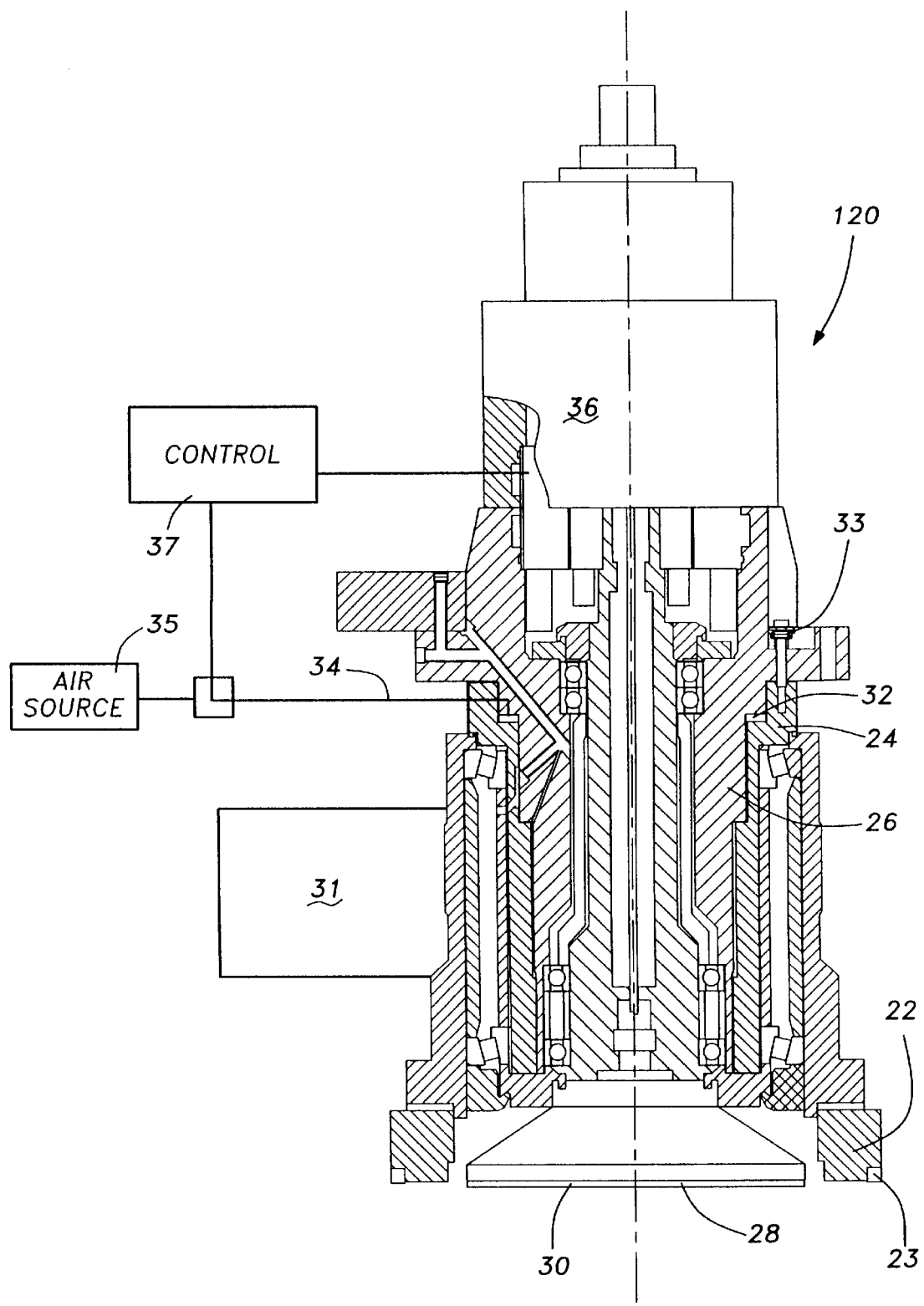
FIG. 1 is a view of the tool for achieving the present invention.

Tool 20, shown in FIG. 1, may be generally of the type disclosed in the U.S. Pat. No. 5,285,600. The main details of the tool form no portion of this invention. The tool includes a milling tool 22 including cutting teeth 23. The milling tool is mounted on a slide bearing 24. Within the slide bearing is a mount 26 for a grinding wheel 28. Grinding wheel 28 and milling tool 22 are coaxially mounted. A grinding face 30 is formed on grinding wheel 28. Milling tool 22 is driven by motor 31, shown schematically.

A pneumatic cylinder chamber 32 is provided with pressurized air through pressurized air line 34. A valve 35 controls the supply of air from a source of compressed air 35 to the chamber 32. A motor 36 drives the grinding wheel 28. A control 37 controls the speed of motor 36, and also the amount of pressurized air supplied to chamber 32 to control the position of the milling tool 22 relative to the grinding wheel 28. By directing more air to chamber 32, the milling tool 22 may be moved downwardly as shown in FIG. 1. On the other hand, springs 33 tend to move milling tool 22 upwardly as shown in FIG. 1 in the absence of additional air in chamber 32. The control 37 is thus able to very accurately control the position of the tool 22 relative to the grinding wheel 28. It should be understood in the description to follow that the amount of adjustment of position of cutting tool 22 is very small, and typically on the order of 1,000ths of an inch. The control 37 uses known technology to achieve very fine control over the exact position. As an alternative to a pneumatic control, hydraulic fluid may be utilized. Further, mechanical linkages may be alternatively utilized.

As shown in FIG. 2, in this type of known tool, a workpiece 38 is machined by the cutting teeth 23 on milling tool 22 to remove a relatively large amount of material. It is typical that the milling cutter removes 0.025 to 0.030 inch of material. Teeth 23 wear during this operation. The grinding wheel 28 and its face 30 follow behind the cutting teeth 23. Amounts of material on the order of 0.0015 inch are removed from the material by grinding wheel 28. This type of tool uses close control over the positioning of the tools and the workpiece to insure that the movement of the tools is parallel to the surface of the workpiece such that this fine finish grinding is achieved.

Figure 3:
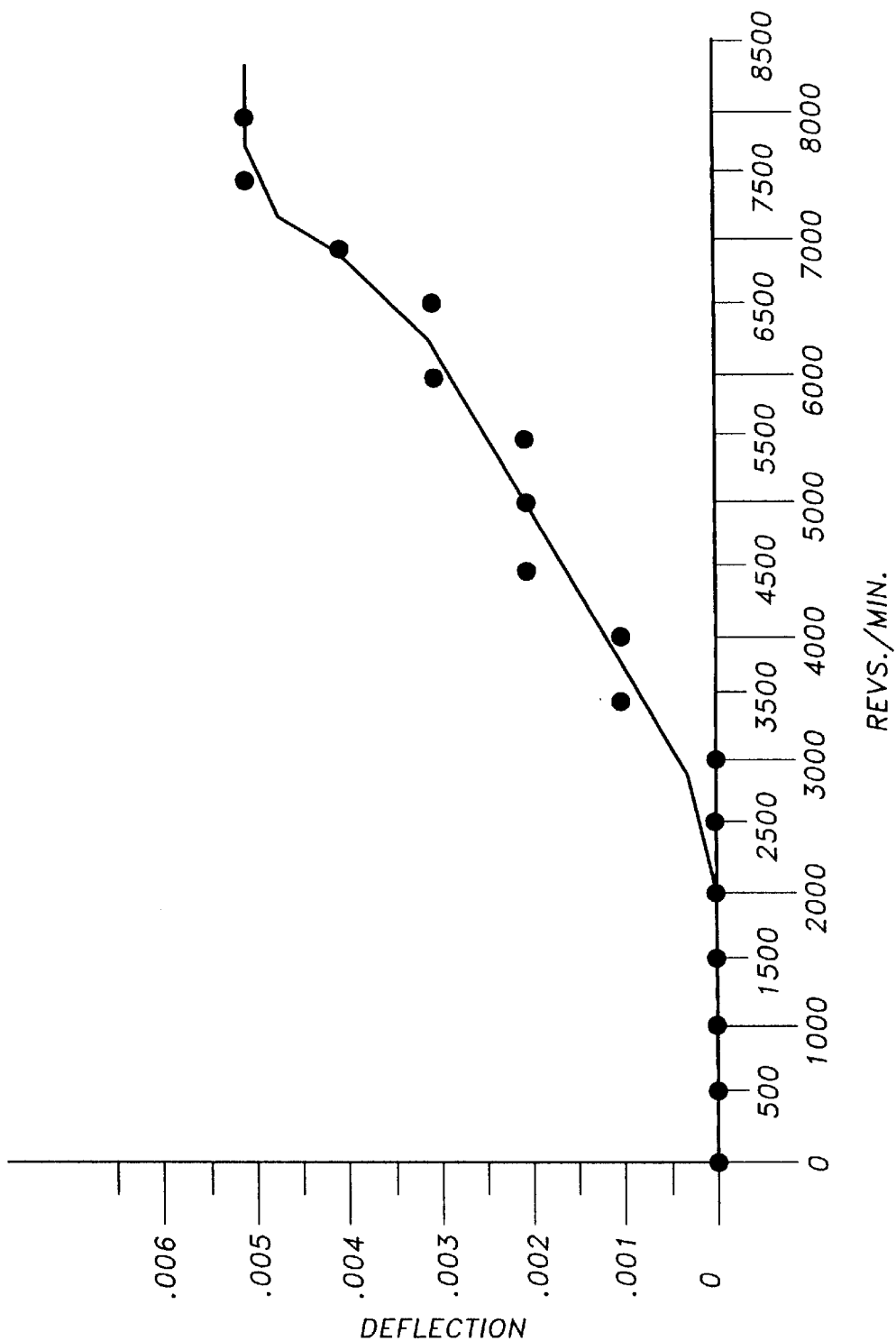
FIG. 3 shows a graph of speed versus deflection for a grinding wheel.

The present invention has recognized one deficiency in this type of tool. In fact, as shown in FIG. 3, when the speed of the grinding wheel is plotted against deflection due to centrifugal force of the grinding wheel, an amount of deflection greater than the amount of grinding stock is often indicated. For example, as shown at 6,000 RPM, there is as much as 0.003 inch of deflection of the grinding wheel 28 rearwardly, or upwardly as shown in FIG. 2. This deflection may well be more than the amount of grinding stock. If the tool shown in FIG. 2 did not compensate for this centrifugal deflection, then the grinding wheel 30 actually would not contact the workpiece 38 at such a speed. The prior art has not recognized this as a problem, nor has it compensated for this deflection. The present invention incorporates expected deflection into the positioning of the milling tool 22 relative to the grinding wheel 28. In addition, the present invention uses this phenomenon to adjust for wear on the milling tool 32. The relatively rigid milling tool 22 does not experience similar deflection.

The amount of deflection as shown in FIG. 3 will, of course, differ with the type of tool. This type of chart is provided experimentally for the particular grinding wheel, and is necessarily prepared for each different grinding wheel type which will utilize the present invention. Once the amount of deflection per speed is determined, it may be possible to establish a formula. The deflection is generally straight-line as shown in FIG. 3, and if a formula has been developed, then the deflection may be easily calculated. Even if a formula is not utilized, the deflections can be stored in a look-up table relative to respective speeds.

As shown in FIG. 4, in a method of utilizing the present invention, one determines the amount of grinding stock desired and an approximate desired speed for the grinding wheel. A worker of ordinary skill in the art will be able to determine both of these quantities based on the particular part to be machined.

Control 37 next determines the amount of expected deflection at the desired speed. As shown in FIG. 4, this may be done by referencing a look-up table, or if a formula has been developed, the formula may be utilized.

The present invention then incorporates that expected deflection into the amount of movement of the milling tool necessary to achieve the desired grinding distance. As explained in the above example, if it is desired to have 0.002 inch of grinding, and if one would expect there to be 0.0015 inch of deflection at the desired speed, then the milling tool is initially positioned 0.0035 inch behind the grinding wheel face by the adjustment structure. The tool is then started, and work is performed. As work is performed, the grinding wheel is pulled rearwardly by centrifugal force, and the exact amount of grinding stock desired is achieved.

The present invention thus provides very fine control over the amount of grinding stock, and provides parts from the grinding wheel as desired and as designed. The present invention is thus an improvement over the prior art as shown in U.S. Pat. No. 5,285,600.

Another feature of the present invention provides for adjustment of the position of the milling tool 22 and grinding tool 28 relative to each other as the cutting teeth 23 wear. The amount of wear per number of cycles is known, or may be determined experimentally. As an example, the amount of wear can be predicted experimentally by utilizing one tool and measuring the amount of wear after a certain amount of cycles. The control 37 preferably has access to a look-up table, with wear per number of cycles is stored. Alternatively, if a formula is available to predict wear, that formula may also be available to control 37. The present invention control 37 is also provided with an acceptable range of speed. As an example, if the initial desired speed is 4,000 RPM, it may be acceptable to increase speed up to 5,500 RPM. Control 37 then goes to the deflection look-up table (or formula) and finds an additional amount of speed necessary to achieve additional rearward grinding wheel deflection to compensate for the amount of wear on the cutting teeth. As an example, if a milling tool positioned 0.0035 inch behind the grinding wheel in a system operating at approximately 4,250 RPM (an approximation of the amount of speed for the grinding wheel that would achieve the example 0.0015 deflection as shown in FIG. 3). The control 37 may determine that after a certain number of operations, a wear of 0.0005 inch is expected on the milling tool teeth. The control then determines from the deflection look-up table (or formula) that by increasing the speed of the grinding wheel to 5,000 RPM, an additional 0.0005 inch of deflection is expected. Control 37 then increases the speed of the motor 36 to increase the amount of deflection of grinding wheel 28 and adjust for wear. This adjustment can occur in real time on an ongoing basis, or may be done periodically. Further, as shown in the flow chart, at some point the amount of wear may demand a speed increase of the grinding wheel that would be beyond an acceptable range. At that time, the control 37 may readjust the position of the milling tool relative to the grinding wheel. Alternatively, at some point, the cutting teeth 23 are also necessarily replaced.

This method of adjusting for wear allows the machine to continuously adjust for wear on the cutting teeth without significant down time. The control may merely change the speed as the tool is speeding up for the next pass, and thus can efficiently continue to machine workpieces.

The present invention discloses a method and apparatus for achieving fine control over the amount of grinding. A worker of ordinary skill in the art would recognize that certain modification would come within the scope of this invention. For that reason, the following claims should be studied to determine the true scope and content of this invention.

I claim:

1. A tool comprising:

a rough cutting tool having cutting members, said rough cutting tool being rotatable about an axis, and said cutting tool members defining a cutting path about said axis at a cutting plane;

a fine grinding tool having a grinding face to be positioned forwardly of said cutting plane by a first distance such that said rough cutting tool provides gross machining on a workpiece, and said grinding tool then provides finish polishing;

position adjustment structure for adjusting the position of said rough cutting tool relative to said grinding tool to achieve said first distance; and a control for said position adjustment structure, said control determining an expected the amount of deflection of said grinding wheel at a desired speed of said grinding wheel, and utilizing said expected amount of deflection to control a desired position of said rough cutting tool relative to said grinding tool.

2. A tool as recited in claim 1, wherein said position adjustment structure moves said rough cutting tool relative to said grinding wheel.

3. A tool as recited in claim 2, wherein said control also determines the amount of wear on said cutting members, and includes an adjustment feature to control a rotational speed of said grinding tool to achieve additional deflection to compensate for said wear on said rough cutting tool.

4. A tool as recited in claim 3, wherein said grinding tool and said rough cutting tool are coaxially mounted.

5. A tool as recited in claim 4, wherein said rough cutting tool and said grinding tool are rotated separate motor s.

6. A tool as recited in claim 1, wherein said position adjustment structure includes a fluid chamber and a source of fluid to drive said rough cutting tool relative to said grinding wheel for desired amounts.

7. A tool as recited in claim 6, wherein said fluid chamber is pneumatic.

8. A tool as recited in claim 1, wherein said grinding tool is mounted coaxially with said rough cutting tool.

9. A tool comprising:

a rough cutting tool having cutting teeth, said rough cutting tool being rotatable about an axis, and said cutting teeth defining a cutting path about said axis at a cutting plane;

a fine grinding tool mounted coaxially on said axis, and within said cutting path, said fine grinding tool having a grinding face to be positioned forwardly of said cutting plane by a first distance, such that said rough cutting tool provides gross machining on a workpiece, and said grinding tool then provides finished-polishing;

a position adjustment structure for adjusting the position of said cutting tool relative to said grinding tool to achieve said first distance; and a control for said position adjustment structure, said control determining an expected the amount of deflection of said grinding wheel at a desired speed of said grinding wheel, and utilizing said amount of deflection to control a desired position of said rough cutting tool relative to said grinding wheel, said control also determining the expected amount of wear on said cutting members, and including an adjustment feature to control a rotational speed of said grinding tool to achieve additional deflection to compensate for said determined wear on said cutting tool.

10. A tool as recited in claim 9, wherein said position adjustment structure moves said rough cutting tool relative to said grinding wheel.

11. A tool as recited in claim 9, wherein said rough cutting tool and said grinding tool are rotated by separate motors.

12. A tool as recited in claim 9, wherein said position adjustment structure includes a fluid chamber and a source of fluid to drive said rough cutting tool relative to said grinding wheel for desired amounts.

13. A tool as recited in claim 12, wherein said fluid chamber is pneumatic.

14. A tool as recited in claim 12, wherein springs bias said rough cutting tool relative to said grinding tool in a first direction, and said fluid biases said rough cutting tool in an opposed direction relative to said grinding tool such that the amount of fluid supplied to said fluid chamber provides accurate control over the position of said cutting tool relative to said grinding tool.

15. A tool as recited in claim 9, wherein said control has access to a look-up table with a chart of deflection of said grinding tool relative to said speed of said grinding tool.

16. A tool as recited in claim 9, wherein a single control controls grinding tool speed and said position adjustment structure.

17. A method of operating a tool comprising the steps of:

1) providing a rough cutting tool having cutting teeth for cutting a surface of a workpiece through a cutting path, and providing a fine grinding tool mounted within the cutting path of said rough cutting tool, providing a control for the relative axial positions of said rough cutting tool and said grinding tool, and providing a position adjustment structure for adjusting the position of said rough cutting tool and said grinding tool, said control controlling said position adjustment structure;

2) determining the amount of deflection of said grinding tool at a particular speed;

3) determining the amount of grinding desired by said grinding tool after said rough cutting;

4) determining a speed of said grinding tool;

5) determining a desired relative position of said rough cutting tool relative to said grinding tool based upon a determined deflection at said determined speed, and calculating a desired relative position of said rough cutting tool and said grinding tool based upon the values determined in Steps 2)–4); and 6) moving said rough cutting tool to a position relative to said grinding tool such that after said grinding tool moves due to centrifugal force, said grinding tool is positioned forwardly of said rough cutting tool by said desired grinding amount.

18. A method as recited in claim 17, wherein a pressurized fluid is utilized to position said rough cutting tool.

19. A method as recited in claim 17, wherein a single control controls both speed of rotation of said grinding tool, and said position of said rough cutting tool.

20. A method as recited in claim 17, wherein the method further includes the steps of determining the amount of wear on said rough cutting tool, determining a speed increase necessary to achieve grinding tool deflection equal to said amount of wear on said rough cutting tool, and increasing a speed of said grinding tool to increase said deflection to the determined amount.

* * * * *